US008626872B2

(12) United States Patent
Lesenne et al.

(10) Patent No.: US 8,626,872 B2
(45) Date of Patent: *Jan. 7, 2014

(54) SYNCHRONIZATION SYSTEM AND METHOD FOR AUDIOVISUAL PROGRAMMES ASSOCIATED DEVICES AND METHODS

(75) Inventors: Laurent Lesenne, Acigne (FR); Alain Maillard, Paris (FR); Frédéric Pasquier, Laille (FR)

(73) Assignee: Thomson Licensing (FR)

( * ) Notice: Subject to any disclaimer, the term of this patent is extended or adjusted under 35 U.S.C. 154(b) by 1889 days.

This patent is subject to a terminal disclaimer.

(21) Appl. No.: 10/519,633

(22) PCT Filed: Jun. 27, 2003

(86) PCT No.: PCT/EP03/50272
§ 371 (c)(1),
(2), (4) Date: Aug. 9, 2005

(87) PCT Pub. No.: WO2004/004360
PCT Pub. Date: Jan. 8, 2004

(65) Prior Publication Data
US 2006/0117339 A1    Jun. 1, 2006

(30) Foreign Application Priority Data
Jun. 28, 2002  (FR) .................... 02 08091

(51) Int. Cl.
*G06F 15/16* (2006.01)
*H04N 5/932* (2006.01)
*H04N 5/77* (2006.01)
(52) U.S. Cl.
USPC ............ 709/218; 709/217; 386/201; 386/228
(58) Field of Classification Search
USPC ........................................... 709/218; 386/38
See application file for complete search history.

(56) References Cited

U.S. PATENT DOCUMENTS

| 4,230,990 A | 10/1980 | Lert, Jr. et al. |
| 5,886,995 A | 3/1999 | Arsenault et al. |
| 5,920,477 A | 7/1999 | Hoffberg et al. |
| 2002/0056129 A1 | 5/2002 | Blackketter et al. |

(Continued)

FOREIGN PATENT DOCUMENTS

| EP | 1286541 A1 | 2/2003 |
| JP | 10191315 | 7/1998 |

(Continued)

OTHER PUBLICATIONS

Tanaka, Kiyoshi,Taura, Takahisa, Akutsu, Akihito, and Tonomura Yoshinobu: "LiveWatch: Interactive Live Broadcast System", ITE Technical Report, Japan, The Institute of Image Information and Television Engineers, Oct. 2001, vol. 25, No. 66, p. 7-12.

(Continued)

*Primary Examiner* — Noel Beharry
(74) *Attorney, Agent, or Firm* — Jack Schwartz and Associates, PLLC

(57) ABSTRACT

The present invention relates in particular to a synchronization system and method. The synchronization system comprises a specification unit for specifying synchronization signals associated with an audiovisual program, the latter comprising an audiovisual content and control information, a recognition unit for recognizing the synchronization signals in a transmitted stream carrying this program, by recognition of at least one extracted portion of the audiovisual content, and an activation unit triggering an action in case of detection of these signals. The specification unit prepares and transmits to the recognition unit recognition elements making it possible to obtain this extracted portion, as well as at least one action timeout lag in case of detection of the synchronization signals. The recognition or activation unit then delays the triggering of this action according to the lag transmitted, in case of detection of the synchronization signals. In variants, the timeout lag is determined and/or the recognition elements are obtained independently of the specification unit.

27 Claims, 5 Drawing Sheets

(56) References Cited

U.S. PATENT DOCUMENTS

2003/0233451 A1* 12/2003 Ludvig et al. ................ 709/225
2007/0005795 A1 1/2007 Gonzalez

FOREIGN PATENT DOCUMENTS

| WO | WO 01/22729 | 3/2001 |
| WO | 0131497 A1 | 5/2001 |
| WO | WO 01/60061 | 8/2001 |
| WO | 0180553 A1 | 10/2001 |
| WO | WO 02/21840 | 3/2002 |

OTHER PUBLICATIONS

Search Report Dated Nov. 18, 2003.

* cited by examiner

SYNCHRONIZATION SYSTEM AND METHOD FOR AUDIOVISUAL PROGRAMMES ASSOCIATED DEVICES AND METHODS This application claims the benefit, under 35 U.S.C. §365 of International Application PCT/EP03/50272, filed Jun. 27, 2003, which was published in accordance with PCT Article 21(2) on Jan. 8, 2004 in English and which claims the benefit of French patent application No. 0208091, filed Jun. 28, 2002.

FIELD OF THE INVENTION

The present invention concerns a synchronization system and method for audiovisual programmes, as well as associated devices and methods. It pertains in particular to units and methods for recognizing and specifying synchronization signals.

DESCRIPTION OF THE RELATED ART

Interactive television allows a viewer to act on the course of the transmissions that he is watching. He can thus interact with interactive services. To do this, mass-market interactive terminals are connected to a dual communication network:

a bidirectional network (modem return path, cable, . . . ) of point-to-point type, such as in particular a telephone network, implementing one or more point-to-point servers, and a unidirectional distribution network, such as in particular an RF, cable or satellite TV broadcasting network, implementing one or more general broadcasting servers; the expression "general broadcasting" (or just broadcasting), is understood to mean the transmitting of identical data to a set of destinations, whether this be performed in particular by radio broadcasting, by cable or by Internet.

The relevant terminals consist for example of television receivers, DVB (standing for Digital Video Broadcasting) decoders or Internet decoders. The interactive services are generally downloaded into the terminals by broadcasting via the unidirectional network. In other cases, they are hosted by servers that can be accessed by the telephone network. These services are then accessed through references or web addresses (also called URLs standing for Universal Resource Locators, or universal addresses) broadcast as an adjunct to an audiovisual programme. They determine the server to which the terminals must address themselves and the service to be invoked on this server. The audiovisual programmes broadcast synchronously either with the services, or with URLs of the services, are then referred to as "enhanced programmes".

In practice, the known techniques of interactive television rely on the operations which follow. A broadcasting centre, or broadcaster, broadcasts an interactive service emanating from a services operator, in a manner synchronized with an audiovisual programme (unidirectional network). For this purpose, data relating to this service are embedded with audiovisual signals specific to this programme. When an interactive terminal receives the enhanced programme thus obtained, it broadcasts on the screen (image and sound) the audiovisual programme and interprets the data of the interactive service. It then screens the latter in synchronization with the audiovisual programme, typically in the form of a video overlayed graphical or textual display.

A viewer can then interact with the interactive service, this interaction possibly leading to the setting up of a connection with a server of the services operator (bidirectional network).

One of the essential aspects of interactive television relates to the establishing and managing of synchronization between programmes and interactive services data. In particular, it is generally envisaged to broadcast the interactive content or its URL in a loop (carousel) for the duration of the associated audiovisual programme. Two items of broadcaster equipment are customarily used for synchronization:

a traffic system, that creates an events execution list (playlist) comprising time information (start time and end time), object information (device to be driven) and operation information (command to be executed);

and an automaton system that manages the execution list so as to drive and control the broadcaster's broadcasting equipment (video servers, video recorders, subtitling apparatus, etc.).

The traffic system enables modifications to be made to the execution list in case of significant modifications in the temporal organization of the programmes. The automation system is for its part capable of tweaking the list in case of last minute tiny modifications, and of redirecting the list to the traffic system if more consequential modifications are required.

The synchronizing of the interactive services with the programmes is achieved by incorporating a broadcasting server (which acts as server of interactive applications) from among the devices to be driven by the automation system. The service operator is assumed to be connected permanently to the broadcaster's broadcasting server, so as to be notified of the actual broadcasting of the programmed contents. This involves a link of the TCP-IP (standing for Transmission Control Protocol/Internetwork Protocol) type or the like in which a layer of a particular application package can be deployed. This link serves in one sense to programme the broadcasting server on the basis of administration applications present at the service operator, and in the other sense to inform the services operator in particular of the state of the broadcasting server, of the progress of broadcasts of contents and of any incidents.

Problems of desynchronization between the broadcasting of the programmes and those of associated interactive contents are thus avoided. Specifically, if an audiovisual programme is delayed or advanced, the execution list is updated by the broadcaster. In this way, the devices used—including the broadcasting server—trigger at the appropriate moments.

However, such a technique requires the intervention of the broadcaster, who must modify his events execution lists to take account of events related to the broadcasting of interactive services. Moreover, it requires a convention between the broadcaster and the services operator, so that they understand one another with regard to commands relating to the broadcasting of such services.

Various procedures have also been proposed in which synchronization signals are inserted into the audiovisual programme itself. Thus, document WO-01/50764 describes a computer method for utilizing an interactive digital television transmission, in which service signals corresponding to "synchronization pulse" sequences, which bring about the downloading of a multimedia application, are detected. In U.S. Pat. No. 5,818,440, an interactive application is downloaded into an interactive television network, and this application is automatically switched on upon the detection of an application token incorporated into the video programme.

Such implementations likewise require the intervention of a broadcaster or of a services provider in order to insert the stream of appropriate synchronization signals, and therefore have an intrusive nature.

These difficulties are resolved by the invention disclosed in document WO-01/91462. This priority document describes a device for synchronizing broadcast audiovisual programmes and complementary information. The device comprises a pictures and/or sound detection assembly capable of extracting at least one semantic element from the content of an audiovisual programme being broadcast. It also comprises a unit for recognizing these semantic elements, linked to a programme guide which comprises a chronologically ordered list of information sets associated with the audiovisual programmes. The recognition unit, prepared by prior learning, selects the information set which is most probably correlated with these semantic elements. A synthesis block then synchronizes the audiovisual programmes with the information sets selected.

However, this invention demands complex means and requires reference to a programme guide.

Patent Application WO-02/21840 proposes a procedure for synchronizing a client with a media signal. According to one embodiment of this procedure, one or more actions corresponding to an audiovisual signal (the media signal) is or are received, an application for performing the actions (for example by syntactic analysis—or "parsing"—of action information) is determined, and a switching on of the actions is triggered by this application. In the examples described, an operator defines actions that he dispatches to a server, which itself transmits them by broadcasting via the Internet to clients. Either the actions dispatched have to be executed as soon as they are received, or they are accompanied by time information making it possible to determine the moments at which to execute them.

A drawback of this procedure is that it demands relatively complex operations in respect of synchronization, either in the form of interventions by an operator at suitable moments, or in the form of prior preparation making it possible to trigger the dispatchings of the actions at the suitable moments.

Document WO-01/82623 discloses the automatic insertion of interactive TV triggering messages ("triggers") into an audiovisual data stream. The insertion can in particular be based on the recognition of particular elements in the stream, such as audio/video samples. Moreover, this insertion can be triggered before or after broadcasting of the stream. The description also mentions the use of a tag table comprising links between, on the one hand, the samples to be found and, on the other hand, interactive elements and associated attributes, such as, for example, the station number.

This very flexible technology is, however, restricted to programmes known in advance, for which the particular elements required must be recorded beforehand for the implementation of the recognition operations. In particular, it is not applicable to transmissions broadcast live.

One possibility for widening the field of applications of this type of technology would consist in introducing recognition elements into audiovisual programmes, these elements being able to trigger the recognition operations at the desired moments. For example, a specific banner could be inserted during the broadcasting of a live transmission. However, such a solution would require inlay steps, that would have to be performed by the transmitting station. This is therefore an intrusive procedure, which is rather impractical in particular when the interactivity is driven by an operator who is not involved in the broadcasting process.

SUMMARY OF THE INVENTION

Document WO-01/60061 deals with methods and apparatus for recording programs prior to or beyond a preset recording time period. In accordance with the described technique, a video signal is processed to generate one or more signatures associated with a broadcast program to be recorded. The signatures are then further processed, for example by being compared with known stored information regarding the broadcast program, so as to determine an actual start time and end time of the program.

The teaching of that document seems interesting in that it introduces some flexibility in the recognition of the exploited synchronization signals. It mentions notably solutions in which recognition is possible even when no specific synchronisation signals are introduced in broadcast signals and when no reference signal is previously stored at the receiving side. This is possible by exploiting the detection of relevant variations in the received audio and/or video signals. However, the signatures may not be always easy and practical to process, because significant detectable signals or signals variations are not necessarily available without being specifically introduced upstream, every time a synchronisation is needed.

The present invention relates to a system and a method of synchronizing audiovisual programmes and interactive services, which may make it possible to be completely unintrusive with regard to broadcasters and operators of services, while permitting simple and reliable implementation and avoiding recourse to a programme guide. The system and the method of the invention enable applications not only to programmes known in advance, but also to transmissions broadcast live or to programmes that have not formed the subject of a processing or of a prior examination.

The synchronization system and method of the invention apply also to other types of synchronization relating to audiovisual programmes, in particular in respect of automatic recordings of films or transmissions, or of automatic substitutions of contents of audiovisual programmes (the user being able, for example, to decide in advance a real-time replacement on screen of a certain category of programmes by another, by means of selection from among several broadcasting sources). What is more, they also relate to radio transmissions. Hereinafter, and for simplicity, including in the definition of the invention, the expression "audiovisual programme" is aimed at audio and/or video programmes.

The subject of the invention are also units and methods for specifying and recognizing synchronization signals, usable for the synchronization system of the invention and capable of offering the aforesaid advantages.

It is also aimed at a broadcasting centre (broadcaster), a service operator, a terminal (interactive or otherwise) for receiving audiovisual programmes and software, which are associated with one at least of the abovementioned subjects of the invention.

For this purpose, the subject of the invention is a recognition unit for recognizing synchronization signals in at least one audiovisual programme received, that audiovisual programme comprising an audiovisual content intended to be broadcast to users (that is to say which is realized in visual or audible form) and control information. The recognition unit is in accordance with claim 1.

The recognition unit of the invention is therefore capable of detecting synchronization signals without any modification being made to the audiovisual programmes, by direct analysis of the audiovisual content (such as pictures, sounds, parts of the latter or combinations) broadcast to the users. Thus, by contrast with the intrusive methods consisting in intervening on the event playlists, no modification of these lists is necessary. In particular, in this way the risks of broadcasting an interactive service on an audiovisual programme that does not correspond are reduced. Specifically, by virtue of the recognition pertaining to the content, an error has a small possibility of occurring, while with the above methods, these risks are considerably increased through the manipulating of identification entities and the presence of a third party providing information which cannot be verified by the services operator (identifier of the programme).

Moreover, in contradistinction to the techniques relying on the recognition of specific detection signals incorporated into the audiovisual programme streams transmitted, no action on the signals carrying these programmes is required.

What is more, as compared with the technique disclosed in Patent Application WO 01/91462, the recognition elements are communicated beforehand to the recognition unit, thereby making it possible to avoid recourse to complex identification techniques associated with a programme guide.

Moreover, the recognition unit of the invention contrasts with the teaching of the prior document WO 01/82623 through the presence of the timeout module, which introduces a lag before the transmission of the action instructions when the synchronization signals are detected in the audiovisual programme. The use of this lag is particularly beneficial, in so far as it makes it possible to lock the synchronization with respect to an event that can be anticipated, then to meter the time gap between this synchronization and a suitable moment, so as to trigger at this moment the actions to be synchronized.

Thus, in particular, a live transmission generally being preceded—or even punctuated—by adverts, it is possible to lock the detection onto an end of advertising banner credits and adjust the timeout so that an interactive service is displayed, for example, 10 minutes after the commencement of the transmission (by way of illustration, the time required by a promoter to announce the possibility of interacting with his television).

This technique may in particular allow a services operator to manage synchronization operations, including with regard to transmissions broadcast live, without having to ask a station broadcasting the transmissions to take a demanding part in these operations. It is in fact sufficient for the station to provide a sample, such as for example an image of an advertising banner, and an approximate timing for the triggering of desired actions, for example the appearance of interactivity. In particular, this embodiment allows synchronization of the broadcasting of interactive services with audiovisual programmes that are designed a priori without any interactivity.

The recognition unit of the invention can also serve in particular to trigger in due course at the level of a terminal, local interactivity or recording during the broadcasting of a film or of a transmission, without it being necessary for this terminal to be supplied beforehand with extracted portions of their content. It is sufficient for the terminal to be capable of recognizing portions of a programme broadcast beforehand (advertising, opening credits for a broadcast or a series, etc.). This recognition can then provide a reference time, on the basis of which several subsequent instants can be accurately determined by means of predefined timeouts. The invention can thus be particularly advantageous in the case where the synchronization is implemented at the level of receivers, since it can make it possible to reduce the dispatching and recording of reference events (gain in bandwidth, in processing time and in space required for storage).

The use of a lag, designed to delay the triggering of an action in case of detection of the synchronization signals, appears to be particularly unexpected having regard to the commonly accepted concepts. Specifically, the concept of lag is associated in the state of the art with a bringing into action at a precise and predefined instant, that the lag makes it possible to specify (such as, for example, in the prior document WO 02/21840, page 8, lines 17-24). On the contrary, in the invention, the lag leads to a non-predefined and unforecastable instant that is conditioned and made precise through the detection of the synchronization signals.

In the definition of the recognition unit, as in the remainder of the patent application, the "units" and "modules" are to be understood in a functional sense, and are therefore not limited to particular realizations. Thus, they may in particular be grouped together into one and the same component or one and the same piece of software, or on the contrary be dispersed among various components. Moreover, the recognition unit can be installed broadcasting side (typically at the broadcaster's premises), service operator side, or in a terminal for receiving audiovisual programmes, preferably an interactive one, in embedded form.

The recognition elements received and/or the portions extracted can be applied to one or to several programmes, broadcasting simultaneously or successively. For example, programmes being recurrent over time, it is sufficient to transmit images just once for a synchronization to actually be programmed.

Moreover, to a given detection of synchronization elements, there may correspond several timeouts defining successive instants. The timeout and transmission modules are then able to use a detection instant as a reference instant, from which the timeout module determines several instants for triggering dispatching of action instructions. In a sophisticated version, the timeout module is able to combine more complex information than a single detection instant and predefined durations to determine these triggering instants. Such information may in particular consist of:

several detection instants (for example two detection instants serve to specify at least three instants for triggering dispatching of instructions);

operators pertaining to the synchronization signals detected (for example, distinct extracted portions are associated respectively with various groups of lags);

detection time slots (for example the lags are shorter if the detections are performed during later time slots);

or any combination of the above information.

Preferably, the modules for receiving and recording the recognition elements in the recognition unit are designed so as respectively to receive and record also at least one timeout lag and the timeout module is designed to use this lag. According to other embodiments, the lag is predefined, or determined locally by the user.

Advantageously, the modules for receiving and recording recognition elements and the module for transmitting action instructions are designed so as respectively to receive, record and transmit identifiers relating to the actions to be triggered. The recognition criteria and the actions to be performed are thus specified at one and the same time.

In a preferred form of communication of action identifiers, recognition elements and action identifiers are received jointly in the form of pairs, each of these pairs comprising a set of recognition elements and an associated identifier of actions.

In other embodiments, the action identifiers are received separately and are applied to all the detections subsequently performed with the successively transmitted recognition elements. In yet other embodiments, the actions to be triggered are predefined, or decided by users independently of the recognition operations.

Preferably, each of the portions of content consists of at least one of the following portions: an image, an image part, a sound and any combination of at least two of these portions.

In a first advantageous form of the recognition elements, the latter include at least one boolean operator. The detection module is designed to detect at least two of the portions of content in conjunction with this boolean operator (such as, in particular, "and" or "or") and the transmission module is designed to transmit the action instructions in case of such detection.

For example, identifications associated with action identifiers are combined in the following manner:

if (image 1 detection AND image 2 detection), then trigger action 1, if (image 3 detection OR image 4 detection), then trigger action 2.

In a second advantageous form of the recognition elements, the latter include at least one time information item. The detection module is designed to detect the portions of content in conjunction with this time information item and the transmission module is designed to transmit the action instructions in case of such detection. Preferably, this time information item comprises at least one information item chosen from among a date of detection and a detection time slot.

For example, a start of detection date/time and an end of detection date/time are indicated for each detection, thereby making it possible to restrict the number of comparisons to be performed for each recognition element received. This technique is beneficial in particular for the broadcasting of interactive services. Specifically, the time of broadcasting of an audiovisual programme is generally known to within a few minutes and only one service is broadcast at a time, so that the programming of a single detection at a given instant is sufficient to trigger the broadcasting of this service.

In another example, the detection of the portions of contents is combined with tests on the current date:

if (image 1 detection AND image 2 detection), then trigger service 1, if (image 3 detection AND current_date( )=06092002), then trigger recording.

In a third advantageous form of the recognition elements, the latter include at least one channel reference. The detection module is then designed to detect the portions of content in conjunction with this channel reference and the transmission module is designed to transmit the action instructions in the case of such detection.

By transmitting an information item regarding the station on which detection should be done, one avoids unnecessarily invoking the recognition unit when no detection is programmed on the current station. This extra information item also makes it possible to programme detection on a station in particular, the recognition element to be detected possibly being broadcast on several stations—for example a commercial break. By default and without any information as to station, the detection is preferably activated permanently and without distinction of station.

Upstream of the recognition unit, the extracted portions of the content of the audiovisual programme can be obtained directly and explicitly from the programme, or be determined separately from the programme by virtue of knowledge of the latter. For example, this may involve a word or a group of words that a presenter has to utter, or an object that has to appear on the screen. In all cases, the portion of content is known a priori, and communicated to the recognition unit prior to the transmission of the audiovisual programmes. The recognition may thus be of a deterministic nature, and not be based in any way on statistical or experimental matches (such as the teaching of document WO 01/91462).

On the other hand, in advantageous embodiments, the detection of the synchronization signals relies on the recognition of several portions of content, or on the crossing of recognition of such portions with other types of information (station, system variable such as the current date, possibly programme guide, etc.). Thus, several images are advantageously used in case of uncertainty regarding the content of the programme or in order to boost the chances of detection of the programme, the detection of one of the images triggering the action process.

Three preferred modes of obtaining the portions extracted by the recognition unit are distinguished, the latter advantageously combining the capabilities of at least two of these embodiments:

the recognition elements include the extracted portion; the extracted portions included in the recognition elements are thus advantageously transmitted to the recognition unit by a specific unit (such as that defined hereinafter as the "specification unit");

the recognition elements comprise instructions for extracting the portion of content in at least one stream of an audiovisual programme previously received by the stream reception module; the recording module is then designed to extract directly this portion of the stream according to the extraction instructions and to record it in the storage space;

and the recognition elements include at least one identifier of the extracted portion, this portion being intended to be recorded in the storage space prior to a detection (as described above).

In the embodiment with extraction instructions, it is possible to receive and record directly the portions extracted from the audiovisual programmes received, under the effect of instructions for extractions at determined instants and according to determined conditions. The module for receiving the transmitted stream is then utilized as part of the recognition elements reception module.

This avoids voluminous transmissions of information, that might be very penalizing in certain cases (for example, communication of complete images in an analogue television environment, for which the bandwidth in terms of data is reduced to a few tens of k-bytes/second).

Thus, according to an advantageous embodiment with implementation of the recognition unit in a terminal, a trigger of particular type is used, indicating to the terminal the fact that the image or the sound broadcast at the moment of receipt of the trigger must be stored, as must the extracted-portion identifier transmitted with the trigger. In practice, the accuracy in the synchronization between the receipt of this trigger and the broadcasting of the image or of the sound to be recorded is not paramount, in so far as any extracted portion whatsoever of a determined sequence able to serve as tag (for example broadcasting of advertising banner credits) may be suitable.

Moreover, in an embodiment combining the modes of obtainment by inclusion of portions in the recognition elements and by utilization of identifiers, the reception and recording modules are able to receive and store extracted portions utilizable for several distinct types of detection. Each portion or set of portions associated with a type of detection is then specified by a one-to-one portion identifier. This prior storage allows the subsequent dispatching to the recognition unit of recognition partial elements including the identifiers of portions instead of the extracted portions themselves. These recognition partial elements, which may comprise recognition information such as in particular time slot, broadcasting channel and/or boolean operator, are possibly accompanied by action information and/or timeout information. Thus, the recognition elements in their entirety are obtained in at least two successive steps: extracted portions, then associated recognition instructions.

This embodiment avoids bandwidth-hungry multiple operations of transmitting one and the same extracted portion, once the initial step of transmitting this portion has been accomplished. Moreover, even in case of single use of an extracted portion, it makes it possible to anticipate subsequent recognition instructions. Thus, the extracted portions can be dispatched in periods of greatest availability of bandwidth (typically, at night or during the weekend) and subsequently communicate the recognition instructions, which may require only a small bandwidth (since the portion identifiers are sufficient to unambiguously designate these portions). In this way, even if these instructions are transmitted only shortly before they are implemented, the reliability of their reception and of their utilization in due course is substantially increased.

The advantages mentioned hereinabove are particularly beneficial if the recognition unit is installed in a terminal, or more generally downstream of an extended communication network designed to support the transport of the extracted portions.

The invention also relates to a specification unit for specifying synchronization signals associated with at least one audiovisual programme, this (or these) audiovisual programme(s) comprising an audiovisual content intended to be broadcast to users and control information, and the synchronization signals being intended to be detected in at least one transmitted stream carrying this audiovisual programme and to thus trigger at least one action.

According to the invention, the specification unit comprises:

a preparation module for preparing recognition elements making it possible to obtain at least one extracted portion of the content of the audiovisual programme, and a transmission module for transmitting the recognition elements independently of transmissions of the audiovisual programme, to at least one recognition unit intended to detect the synchronization signals in the transmitted stream carrying the audiovisual programme, by recognizing the extracted portion(s) in the content of the audiovisual programme.

The preparation and transmission modules of this specification unit are designed respectively to prepare and transmit at least one action timeout lag in case of detection of synchronization signals.

This specification unit is preferably capable of cooperating with any one of the embodiments of the recognition unit of the invention. The action timeout lag transmitted by the specification unit can also be utilized downstream of the recognition system, at the level of the executing of the actions.

More precisely, in a first form of use of the timeout lag, the latter is designed to bring about a timeout between the detection of the detection signals and the transmission of action instructions. The lag is then preferably transmitted separately from the recognition elements and action identifiers, and jointly with the corresponding elements and identifiers. In a second form, it is designed to bring about a timeout between the reception of action instructions and their triggering. The lag is then preferably incorporated into a corresponding action identifier.

Preferably, the preparation and transmission modules of this specification unit are designed respectively to prepare and transmit identifiers relating to the actions to be triggered in case of detection of the synchronization signals.

The action identifiers then advantageously relate to at least one of the following actions: broadcasting of an interactive service, triggering of an interactive service, triggering of an update of an interactive service, triggering of a recording of the audiovisual programme and connection to a website. The first action is more specifically intended for a detection of synchronization signals at the level of a broadcaster or of a services operator, while the last three actions are typically applicable in the case where the recognition is performed in a terminal for receiving audiovisual programmes (for example triggering of an embedded service, possibly consisting in the triggering of its appearance).

It is thus possible to distinguish in particular two embodiments implementing an action timeout lag:

local determination of the lag at the level of the detecting of the synchronization signals or of the executing of the action (predefined lag or one chosen by a user);

or determination of the lag upstream of the detection, preferably at the level of the specifying of the recognition elements.

Moreover, in each of these two cases, it is possible to envisage an application of the action timeout lag at the detection level, or at the action execution level.

Moreover, in other embodiments already alluded to above, this determination can pertain to criteria giving the timeout lag or lags. For example, pairs of lags and of time slots respectively associated are determined for the detecting of the synchronization signals.

As far as the recognition elements are concerned, the following three embodiments are distinguished for the obtainment of the extracted portion:

the recognition elements include this extracted portion;

the recognition elements comprise instructions for extracting this extracted portion in at least one stream of an audiovisual programme previously received by the recognition unit;

and the recognition elements include at least one identifier of this extracted portion previously recorded in the storage space.

The invention also relates to an assembly for activation by recognition of synchronization signals in at least one audiovisual programme received, comprising a recognition unit and an activation unit and in accordance with claim 15. In such an activation assembly, the triggering delay by means of the timeout lag is applied either by the recognition unit, or by the activation unit, or by both (two aggregated delays). It is beneficial for the recognition unit to be in accordance with one of the embodiments of the invention.

According to an advantageous form, the activation assembly is designed to receive said timeout lag with the recognition elements.

The invention applies also to a synchronization system as defined in claim 17, comprising a unit for specifying synchronization signals, a unit for recognizing the synchronization signals, and an activation unit designed to trigger at least one action in case of detection of the synchronization signals by the recognition unit.

The recognition unit, the specification unit and/or the activation assembly made up of the recognition and activation units, are preferably in accordance with any one of the embodiments of the invention.

The subjects of the invention are also a broadcasting centre, a services operator and a terminal for receiving audiovisual programmes, comprising a specification module, a recognition module, an activation assembly and/or a synchronization system which are in accordance with any one of the embodiments of the invention.

In the case where the recognition unit is in a reception terminal, according to an advantageous implementation, recognition elements and associated interactive services are advantageously transmitted in phase advance to the terminal. When, for example, the viewers are offered no interactivity, this makes it possible to increase the proportion of televisions capable of offering interactivity. The terminal then preferably has means for storing the recognition elements and interactive services in the permanent memory, for example of flash type. This embodiment makes it possible to program continuing synchronizations with switch offs and switch ons of the terminal. In this way, the chances of offering interactivity are increased despite a complete provisional shutdown of the system.

In a first mode of dispatching the recognition elements and associated services to a terminal comprising a recognition unit, one or more associations of sets of recognition elements and of corresponding interactive services are transmitted jointly (in phase advance), preferably by broadcasting. The dispatching of several associations of this type which are intended to be utilized in parallel is completed by communicating action identifiers coupled to the sets of elements, these identifiers indicating which services are the ones to be instigated.

In a second mode of dispatching the recognition elements and associated services to a terminal comprising a recognition unit, the dispatching of the recognition elements and of the services is separated. Action identifiers are then attached to the recognition elements so as to make the latter correspond to the services to be instigated.

The invention also relates to a method of activation by recognition of synchronization signals in at least one audiovisual programme received, in accordance with claim 21. This recognition method is preferably implemented by means of an activation assembly in accordance with any one of the forms of the invention.

The invention moreover relates to a method of specifying synchronization signals and a method of synchronization which are respectively in accordance with claims 22 and 23. These methods are preferably implemented respectively by means of a specification unit and a synchronization system which are in accordance with any one of the forms of the invention.

Preferably, in the methods defined hereinabove, the audiovisual programmes comprise at least one recognition part containing at least one of the recognition portions, and at least one live transmission intended to be broadcast following the recognition part. In this way, the synchronization signals are detected during the broadcasting of the recognition part and the action is triggered during the broadcasting of the following live transmission, by means of the timeout lag.

The subject of the invention is also a computer programme product, characterized in that it comprises programme code instructions for executing the steps of one of the methods according to the invention when this programme is executed on a computer. The expression "computer programme product" is understood to mean a computer programme support that can consist not only of a storage space containing the programme, such as a diskette or a cassette, but also of a signal, such as an electrical or optical signal.

The invention will be better understood and illustrated by means of the following wholly nonlimiting exemplary embodiments and implementations, with reference to the appended figures in which:

DETAILED DESCRIPTION OF THE PREFERRED EMBODIMENTS

Figure 1:
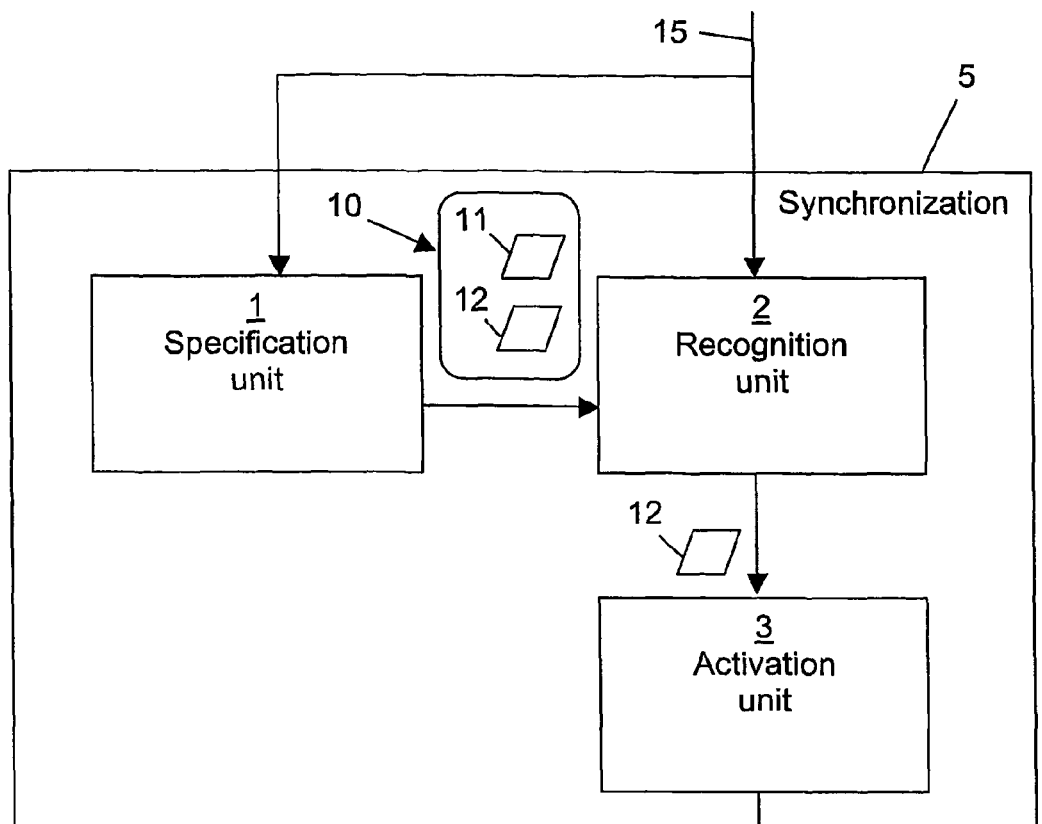
FIG. 1 is a basic diagram of a synchronization system in accordance with the invention.

A synchronization system 5 (FIG. 1) is designed to synchronize audiovisual programmes 15 and interactive services S. It comprises a synchronization signals specification unit 1, able to prepare pairs 10 each consisting of a set of recognition elements 11 and of an action identifier 12, from audiovisual programmes 15 and selection operations performed by a user, before broadcasting of the programmes 15 over a network. In each of these pairs 10, the recognition elements 11 include at least one extracted portion of the content of the programme 15, which portion is intended to serve as synchronization signal (at least partial). The action identifiers 12 of each of the pairs 10 contain information relating to the execution of actions in case of detection of such synchronization signals in the streams carrying the programmes 15.

A recognition unit 2 is designed to record the pairs 10 originating from the specification unit 1, to use them upon receipt of streams carrying the programmes 15 so as to recognize the portions of content in the programmes and, under the conditions defined by the sets of recognition elements 11, to identify occurrences of synchronization. It is also intended to transmit the action identifiers 12 for triggering of these actions, in case of detections of identification signals corresponding to these actions.

An activation unit 3 is designed to receive the action identifiers 12 originating from the recognition unit 2 and to trigger the appropriate actions A.

Figure 2:
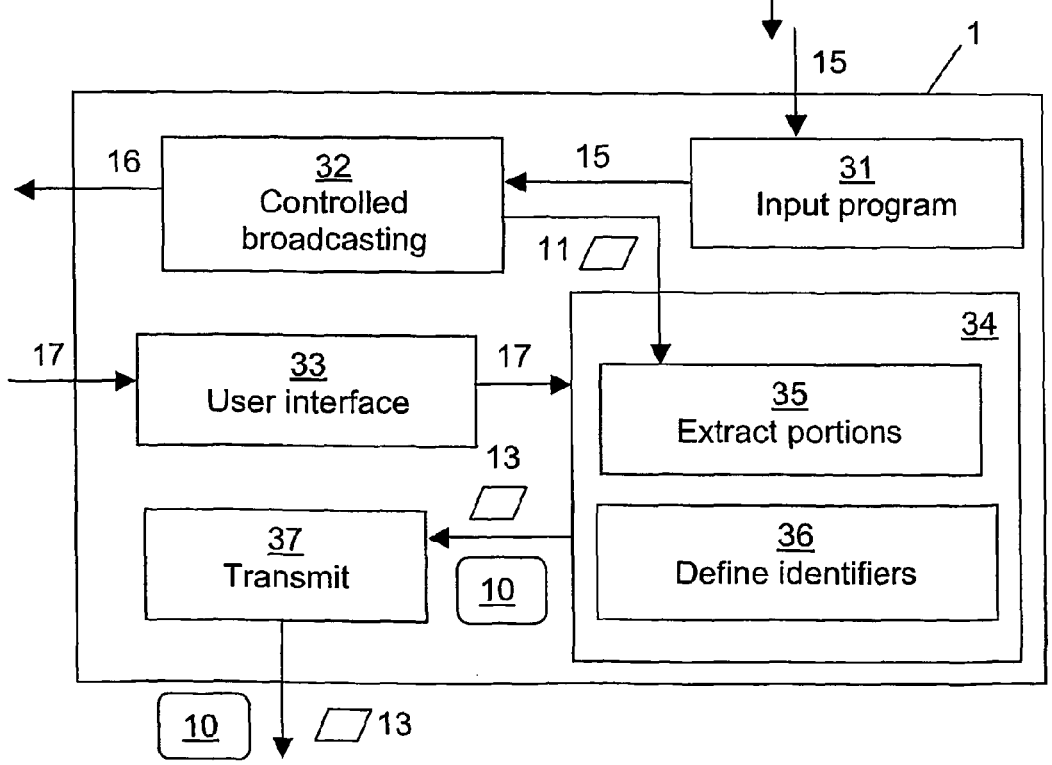
FIG. 2 represents a specification unit of the synchronization system of FIG. 1.
Figure 3:
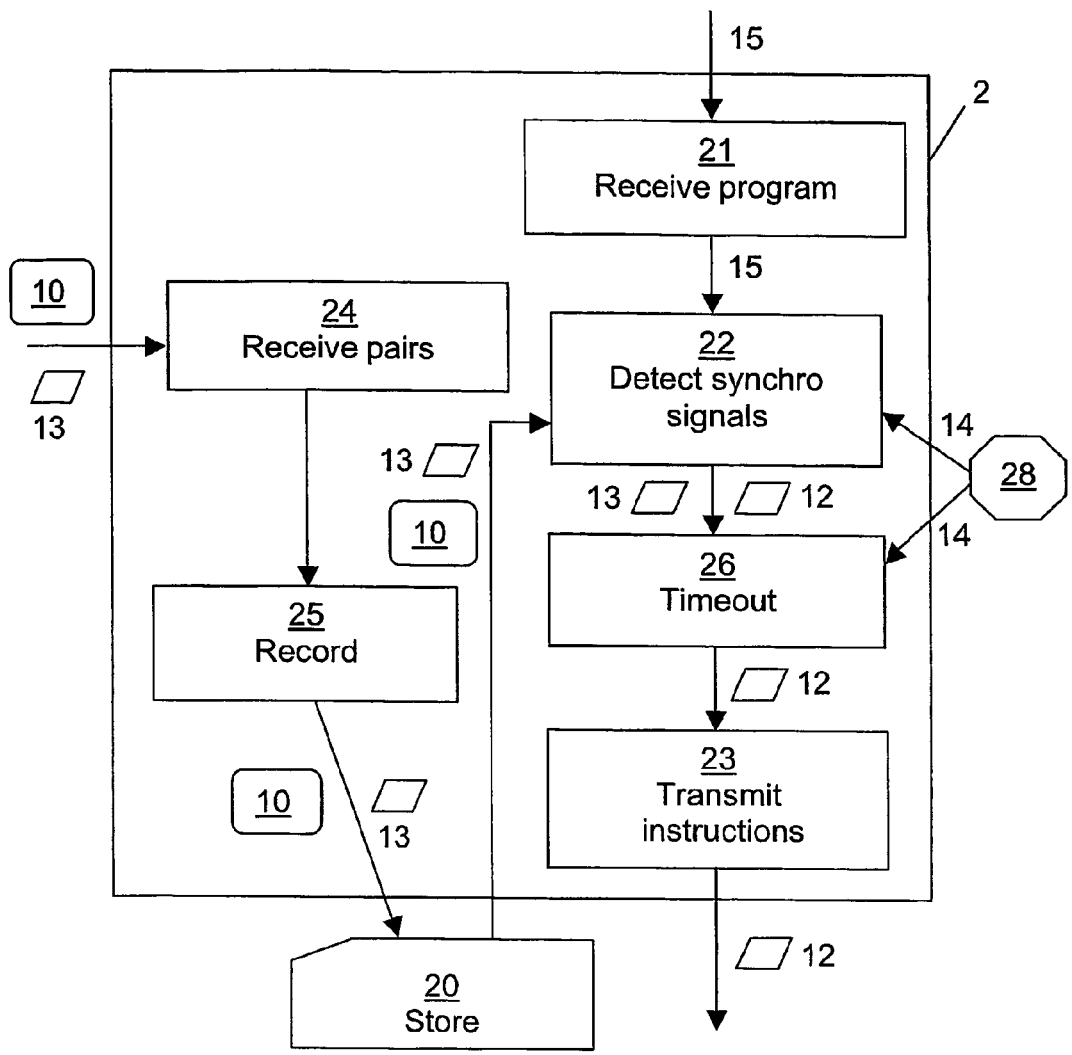
FIG. 3 represents a recognition unit of the synchronization system of FIG. 1.
Figure 4:
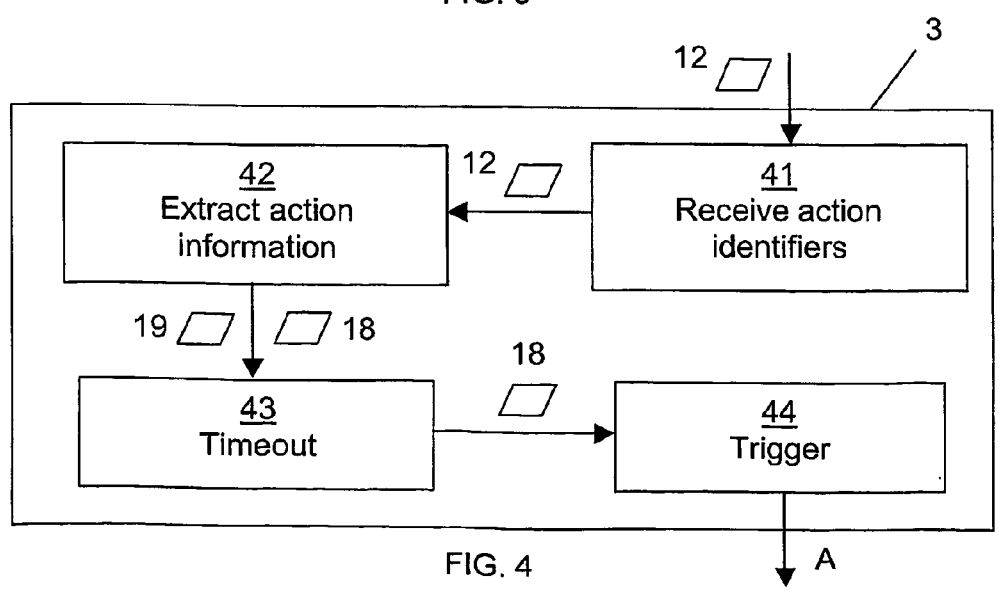
FIG. 4 represents an activation unit of the synchronization system of FIG. 1.

The three units 1, 2 and 3 of the synchronization system will now be detailed, with reference respectively to FIGS. 2, 3 and 4. The specification unit 1 (FIG. 2) comprises an input module 31 for the audiovisual programmes 15 and a module 32 for controlled broadcasting to an operator of contents 16 of these programmes 15. The programmes 15, or at least significant parts of these programmes (picture, sound, colour of a banner, etc.), are for this purpose available in phase advance for the operator responsible for programming the synchronization system 5. Typically, the latter has available a recording on cassette or DVD, or a sequence intended to be inserted into a transmission. The operator can, for example, view one of the programmes 15 picture by picture, or listen to certain passages of sound.

A user interface 33 of the specification unit 1 allows the operator to input commands 17 in conjunction with this controlled broadcasting. It permits the operator to select pictures, sounds, parts of pictures or combinations of these portions of content, so as to construct them into recognition elements 11. The interface 33 also allows him to define more complex recognition criteria, based on conjunctions or alternatives (respectively: several portions, or at least one portion from several, to be recognized), time criteria (date, time slot) or stations. The interface 33 also allows the operator to define action identifiers 12 associated with the recognition elements 11, such as the triggering or the broadcasting of an identified interactive service, and timeout lags, between the detecting of synchronization signals and the triggering of corresponding actions. Such lags are:

either transmitted separately in the form of lags 13 designed for a timeout between a detection by the recognition unit 2 and a transmission of the action identifiers 12 to the activation unit 3, or incorporated into the action identifiers 12 for timeouts between their reception by the activation unit 3 and the triggering of the corresponding actions A.

The joint use of the two types of lags is also possible.

A preparation module 34 establishes the pairs 10 and the lags 13 as a function of the operator's commands and communicates them to a transmission module 37 for transmission to the recognition unit 2. This preparation module 34 comprises in particular a submodule 35 for extracting the portions selected from the programmes 15 and a submodule 36 for defining the action identifiers 12.

The recognition unit 2 (FIG. 3) comprises for its part a reception module 21 for receiving the audiovisual programmes 15 and a reception module 24 for receiving the information originating from the specification unit 1, including the pairs 10 and the timeout lags 13. A recording module 25 makes it possible to automatically record this information in a storage space 20.

The recognition unit 2 also comprises a synchronization signals detection module 22 intended in particular for comparing the contents of the programmes 15 with the portions of contents of the recognition elements 11, contained in the pairs 10 stored in the storage space 20. The detection module 22 is in conjunction with the information sources capable of serving for the identification of the selection criteria, for example a clock 28 providing time information in case of time criteria (date, time span). The detection module 22 is designed to communicate the action identifiers 12 and the associated timeout lags 13 as they are in case of detection of the synchronization signals, to a transmission module 23 for transmitting instructions via a timeout module 26. The function of the latter is to possibly time out the transmission in the presence of timeout lags 13, while the transmission module 23 is intended to transmit the action identifiers 12 to the activation unit 3 as they are.

In an improved version, the interface 33 and the preparation module 34 of the specification unit 1 permits the operator not only to shape the recognition elements 11 including the portions of contents to be used for detection, but also to proceed in another manner, by formulating information which allows the recognition unit 2 to identify and obtain the portions of contents via the reception module 21 for receiving the audiovisual programmes 15. For example, this information may consist of a channel and a timetable, this timetable possibly being replaced by an indicator of instantaneous selection. This information may be dispatched in the form of triggers, designed to trigger at the level of the recognition unit 2 the extraction and the recording of the targeted portions.

The recording module 25 of the recognition unit 2 is then capable of proceeding to the recording of the extracted portions as a function of the information transmitted by the specification unit 1, without these portions having had to travel between the specification unit 1 and the recognition unit 2.

The activation unit 3 (FIG. 4) comprises a reception module 41 for receiving the action identifiers 12, a module for extracting action information from these identifiers 12, and for transmitting action instructions 18 and timeout lags 19, if any, to an action triggering module 44, via a timeout module 43. The function of the latter is to time out the transmission of the action instructions 18 as they are, according to the timeout lags 19. The job of the triggering module 44 is to trigger the actions A targeted by the action instructions 18, as soon as the latter are received.

Figure 5:
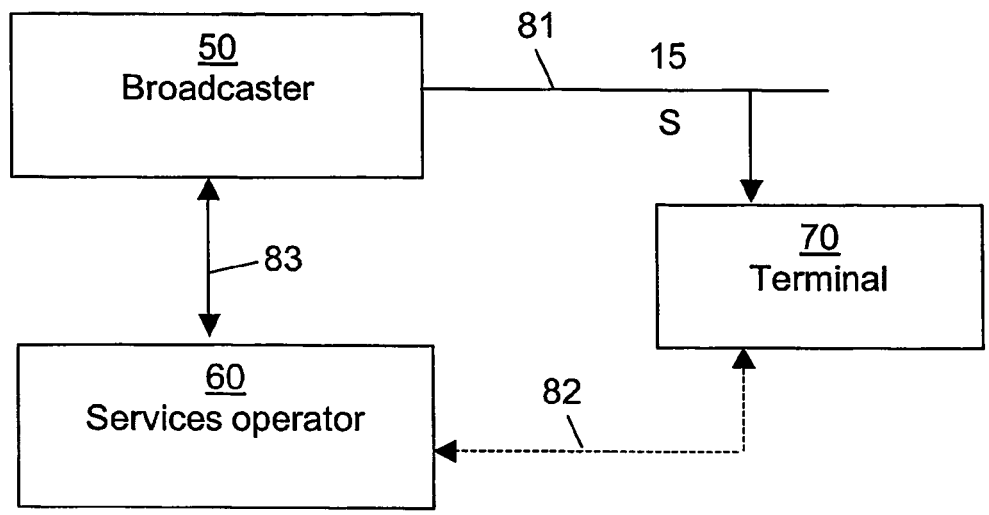
FIG. 5 diagrammatically illustrates a communication network comprising a broadcasting centre (or broadcaster) together with a broadcasting server, a services operator together with point-to-point server and a mass-market terminal, interactive or otherwise.

The synchronization system 5 will now be set forth in several practical applications of interactive television, involving a communication network (FIG. 5) which comprises a broadcaster 50, a services operator 60 and a mass-market interactive terminal 70. The broadcaster 50 is linked to terminals of the type of the terminal 70, by a mono-directional network 81 (an RF cable or satellite TV broadcasting network). The services operator 60 may or may not be linked to the terminal 70, by a bi-directional network 82 (modem return path, cable, etc.) of point-to-point type, such as the telephone network. The broadcaster 50 and the services operator 60 are, for example, connected to one another by a link 83 of the TCP-IP type, on which a bus in accordance with the CORBA (standing for Common Object Request Broker Architecture) standard is deployed.

Figure 6:
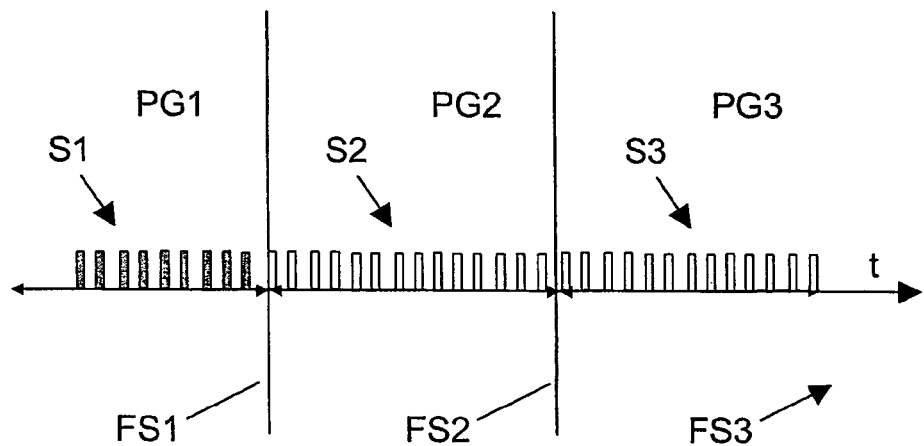
FIG. 6 shows the time profile of a carousel broadcast of services.

It is envisaged that the broadcaster 50 broadcasts in a loop (carousel) interactive contents or their URLS, called interactive services S for simplicity, for the duration of the associated audiovisual programmes 15. In an operational example (FIG. 6), the broadcaster 50 broadcasts successively in the course of the time t the services S1, S2 and S3 in a loop, jointly with the respective enhanced programmes PG1, PG2 and PG3, until instants of end of availability FS1, FS2 and FS3 of the services S.

In a first embodiment (FIG. 7), the synchronization system 5 is installed in a computer 62 of the services operator 60 and is controlled by an operator 61 via a network 84. When operational, the following is carried out:

Step 1: programming of the specification unit 1 of the synchronization system 5, by locking onto the station where the audiovisual programme 15 is broadcast and defining of pictures and/or sounds to be detected (recognition elements 11) and the action identifier 12 to be dispatched;

Step 2: when the moment of broadcasting the programme 15 has arrived, a video server or a video recorder of the broadcaster 50 commences the broadcasting of the audiovisual programme 15;

Step 3: broadcasting of the audiovisual programme 15 alone (via broadcasting relays 56);

Step 4: the synchronization system 5 then receives the audiovisual programme 15 pictures with which it has to synchronize an interactive service S and analyses them;

Step 5: when the programmed picture is detected, the synchronization system 5 notifies a broadcasting server of the broadcaster 50, which can then trigger the broadcasting of the interactive service S simultaneously with the audiovisual programme 15;

Step 6: broadcasting of the interactive service S and of the audiovisual programme 15 simultaneously.

Figure 7:
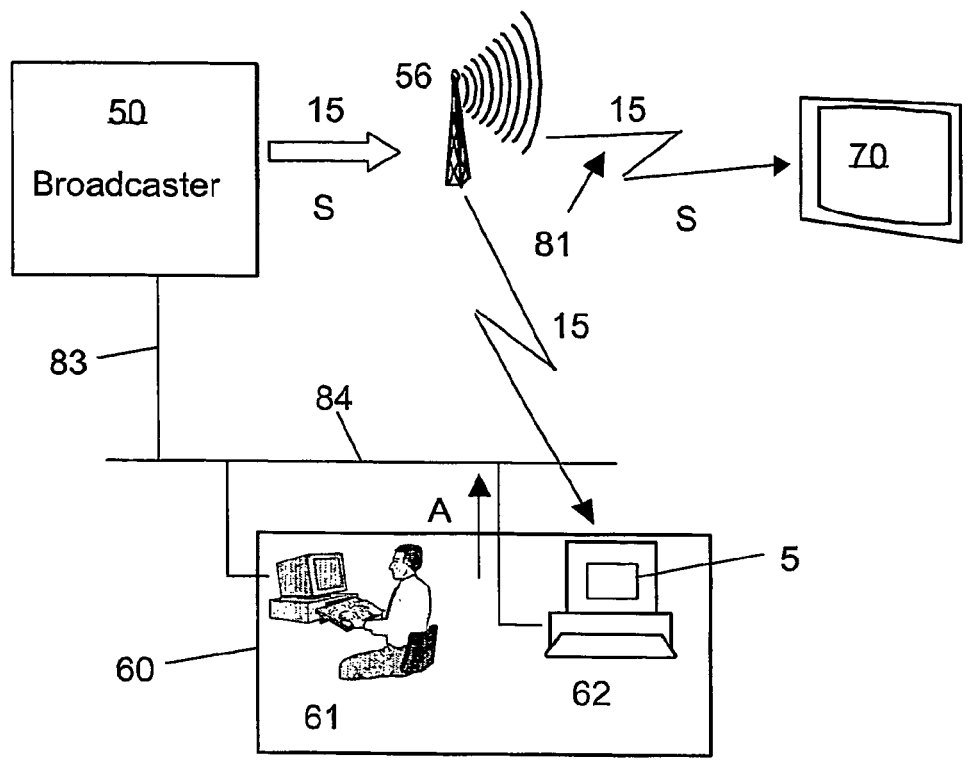
FIG. 7 shows a first mode of implementation of the synchronization system of FIG. 1 in the communication network of FIG. 5, with synchronization system at the services operator's premises.
Figure 8:
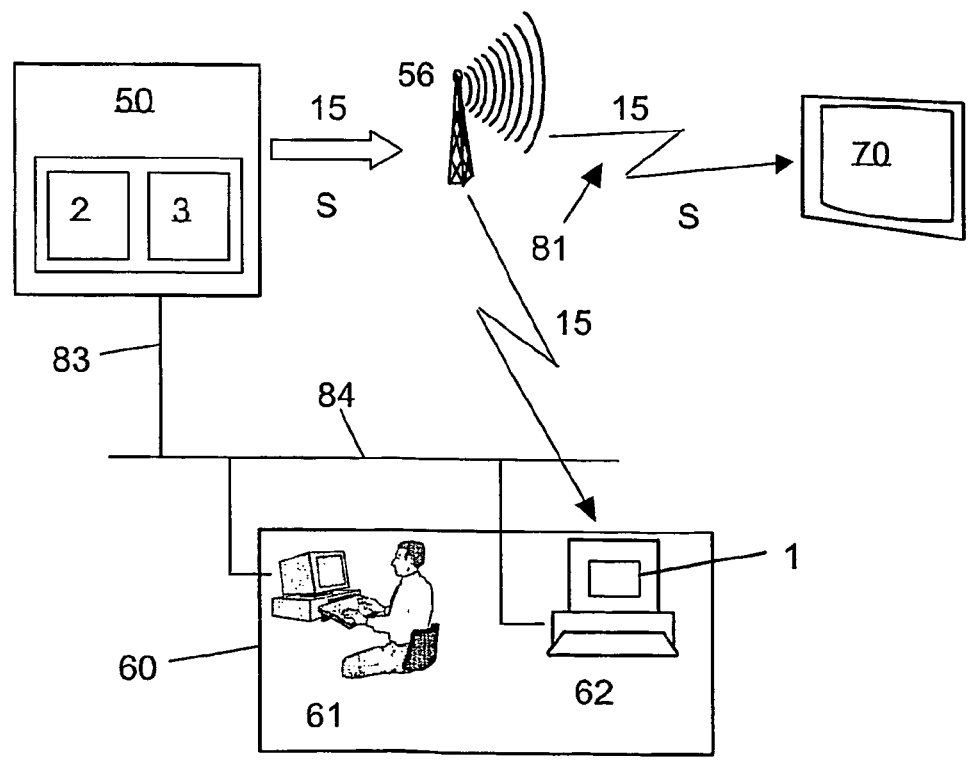
FIG. 8 shows a second mode of implementation of the synchronization system of FIG. 1 in the communication network of FIG. 5, with specification unit at the services operator's premises and recognition and activation units at the broadcaster's premises.

In a second embodiment (FIG. 8), the specification unit 1 is installed within the services operator 60, as in the first embodiment of FIG. 7, but the recognition 2 and activation 3 units are installed in the broadcasting server of the broadcaster 50. The course of the operational steps is for the remainder similar to that of the first embodiment.

Figure 9:
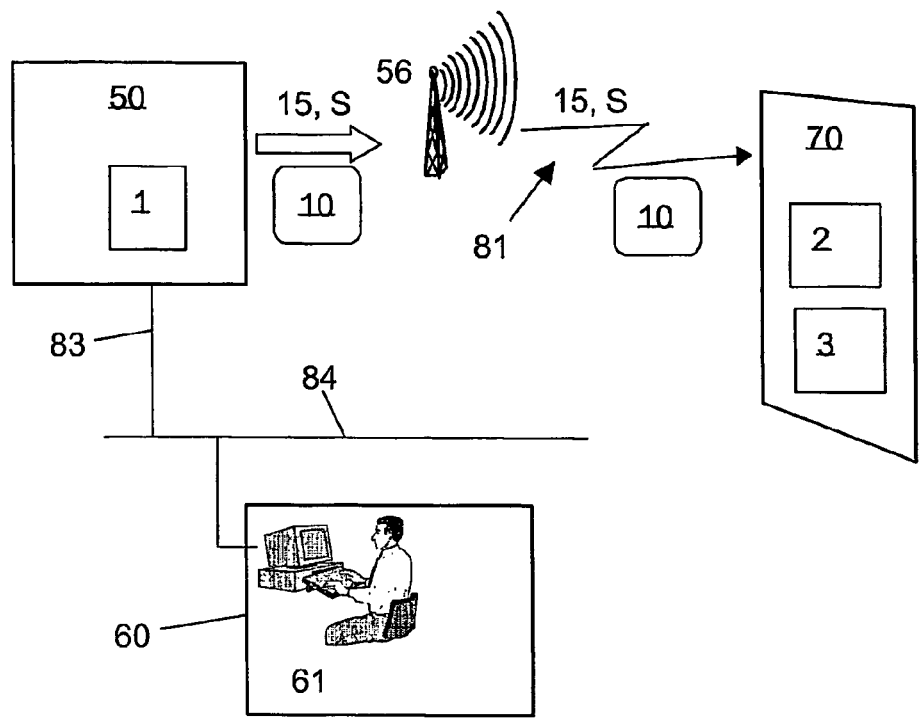
FIG. 9 shows a third mode of implementation of the synchronization system of FIG. 1 in the communication network of FIG. 5, with specification unit at the broadcaster's premises and recognition and activation units in the terminal.
Figure 10:
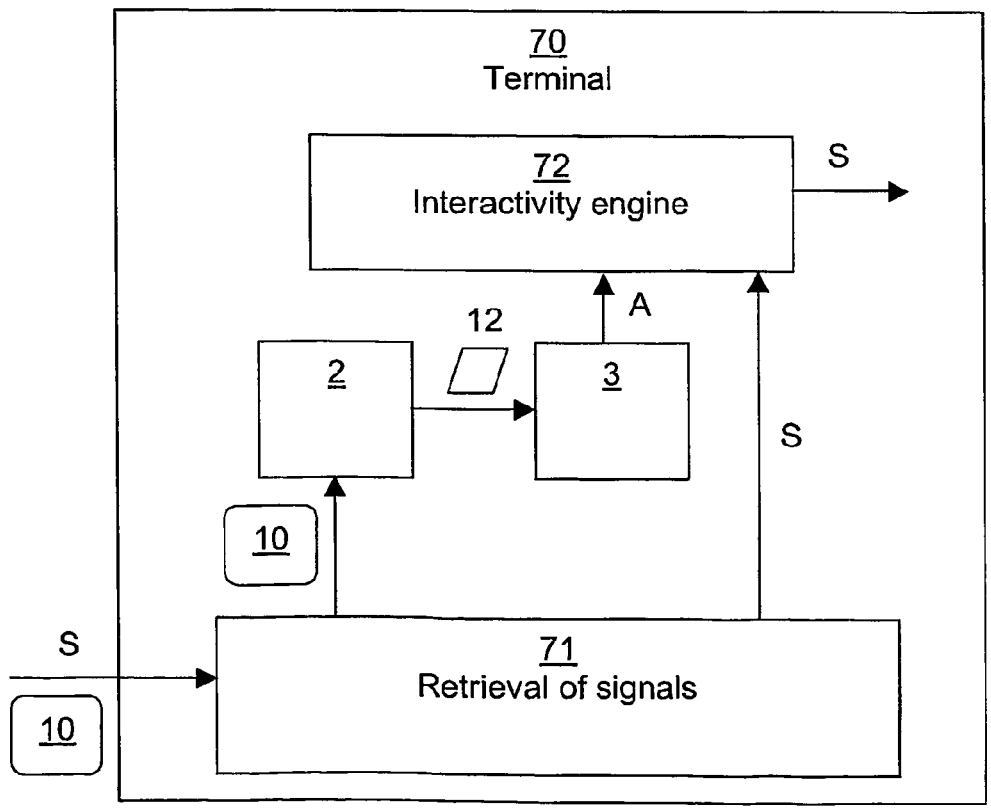
FIG. 10 represents in diagrammatic form a set-up of the recognition and activation units in the terminal, for the mode of implementation of FIG. 9.

In a third embodiment (FIG. 9), the specification unit 1 is now installed at the broadcaster 50, and the recognition 2 and activation 3 units are embedded in the terminal 70. More precisely (FIG. 10), the terminal 70 comprises a block 71 for retrieving broadcast signals (involving the operating system and drivers), which is designed to receive in particular pictures to be detected (more generally: pairs 10 of sets of recognition elements 11 and of action identifiers 12) and interactive services S. This block 71 is designed to communicate the pictures to be detected to the recognition unit 2, and the interactive services S to an interactivity or presentation engine 72.

While operational, the following is carried out:

Step 1: programming by an operator of the broadcaster 50 of the recognition unit 2 of the synchronization system 5, by choosing the sound or picture elements for the synchronization and broadcasting in phase advance of the element to be detected (more generally: of the pair 10) and of the interactive service S to be executed when this element is detected;

Step 2: when the moment of broadcasting the programme 15 has arrived, a video server or a video recorder of the broadcaster 50 commences the broadcasting of the audiovisual programme 15;

Step 3: broadcasting of the audiovisual programme 15 alone;

Step 4: the recognition unit 2 embedded in the terminal 70 then receives the audiovisual programme 15 pictures to which it has to synchronize the interactive service S and analyses them;

Step 5: when the programmed picture and/or sound is detected, the recognition unit 2 notifies the interactivity engine 72 via the activation unit 3, and the engine 72 can then trigger the execution of the interactive service S; in variants, the action to be triggered is the displaying or the updating of the interactive service on the terminal 70;

Step 6: appearance of the interactive service S and of the audiovisual programme 15 simultaneously.

An advantage of this third embodiment as compared with the first two is that a shift is avoided between the moment at which the audiovisual programme 15 is broadcast and the moment at which the interactive service S is inserted into the latter. However, it requires appreciable resources in the terminal 70 (CPU, memory, etc.).

In a variant embodiment, the specification unit 1 is designed to communicate beforehand to the recognition unit 2, several extracted portions associated respectively with one-to-one identifiers of portions. Thus, during the phase of storing each extracted portion in the storage space 20, the recording module 25 also stores the corresponding portion identifier. During a subsequent step of specifying a targeted detection, the specification unit 1 simply has to dispatch the portion identifiers instead of the portions themselves, in the recognition elements 11 of the pairs 10. These identifiers then play the role of keys making it possible to link the appearance of the extracted portions and the other parameters, such as in particular timeout lags 13 or 19 and/or actions to be triggered.

For example, the prior step of transmitting extracted portions defines three identifiers ID1, ID2 and ID3 associated respectively with three extracted portions POR1, POR2 and POR3 (Table 1), then the subsequent transmission step giving instructions for synchronizing actions defines lags and actions A' and A" respectively associated with the identifiers ID2 and ID1 (Table 2).

TABLE 1

Recording of portions and of associated identifiers

| Portion identifier | Extracted portion |
|---|---|
| ID1 | POR1 |
| ID2 | POR2 |
| ID3 | POR3 |

TABLE 2

Instructions for synchronizing actions

| Portion identifier | Lag | Action |
|---|---|---|
| ID2 | 8 | A' |
| ID1 | 10 | A" |

In a particular embodiment of this variant, the detection specifications targeted may also contain detection time slots. If the recognition unit 2 detects that the current time is outside these time slots, it does not proceed to the analysis of the contents broadcast. In the converse case, the detection module is activated. Several recognition time slots may moreover overlap. For example, the identifiers ID1 and ID2 are respectively associated with a detection "Every Friday between 3 p.m. and 4 p.m." and "Every day except weekends between 12 midday and 4 p.m.".

The invention claimed is:

1. Recognition unit comprising a processor for executing instructions for recognizing audiovisual portions of audiovisual content from at least a first audiovisual programme in at least a second audiovisual programme, said audiovisual portions serving as synchronization signals, each of said audiovisual portions of audiovisual content consisting of at least one of the following audiovisual portions: an image, an image part, a sound and any combination of at least two of said audiovisual portions, and said at least a first audiovisual programme and said at least a second audiovisual programme, being audio and/or video, comprising an audiovisual content to be broadcast to users, said recognition unit comprising:
 a reception module for receiving recognition elements and a recording module for recording said recognition elements in a storage space, said recognition elements comprising at least one audiovisual portion of audiovisual content extracted from said at least a first audiovisual programme, said recognition elements being constructed from pictures, sounds, parts of pictures or combinations of these audiovisual portions of audiovisual content of said first audiovisual programme, said at least one audiovisual portion being also comprised in said at least a second audiovisual programme, and said recording module extracting said at least one audiovisual portion of content from said at least a first audiovisual programme and said recording module recording said at least one extracted audiovisual portion in said storage space,
 a reception module for receiving said at least a second audiovisual programme and said at least a first audiovisual programme, said at least a first audiovisual programme being received prior to reception of said at least a second audiovisual programme, a detection module for detecting said synchronization signals in said at least a second audiovisual programme by means of said recognition elements stored in said storage space, by recognition in the audiovisual content of said at least a second audiovisual programme, of said at least one extracted audiovisual portion, and a transmission module for transmitting action instructions in case of detection of said synchronization signals in said at least a second audiovisual programme, said instructions triggering at least one action, and said recognition unit also comprising a timeout module for timeout before said transmission of action instructions by the transmission module when said synchronization signals are detected in said at least a second audiovisual programme.

2. Recognition unit according to claim 1, wherein said reception module for receiving recognition elements and said recording module for recording said recognition elements receive and record also at least one timeout lag and in that the timeout module uses said lag.

3. Recognition unit according to claim 1, wherein the module for receiving recognition elements and said recording module for recording recognition elements and the module for transmitting action instructions respectively receive, record and transmit identifiers relating to said actions to be triggered.

4. Recognition unit according to claim 1, wherein said recognition elements include at least one Boolean operator, said detection module detecting at least two of said audiovisual portions of audiovisual content in conjunction with said boolean operator and the transmission module transmitting said action instructions in case of such detection.

5. Recognition unit according to claim 1, wherein said recognition elements include at least one time information item, said detection module detecting said audiovisual portions of audiovisual content in conjunction with said time information item and the transmission module being transmitting said action instructions in case of such detection.

6. Recognition unit according to claim 5, wherein said time information item comprises at least one information item chosen from among a date of detection and a detection time slot.

7. Recognition unit according to claim 1, wherein said recognition elements include at least one channel reference, said detection module detecting said audiovisual portions of audiovisual content in conjunction with said channel reference and the transmission module transmitting said action instructions in the case of said detecting.

8. Recognition unit according to claim 1, wherein the reception module for receiving recognition elements receives among said recognition elements, instructions for extracting said at least one audiovisual portion of said at least a first audiovisual programme, and said recording module extracts directly said at least one audiovisual portion according to said instructions for extracting and records said at least one audiovisual portion in the storage space.

9. Recognition unit according to claim 1, wherein the reception module for receiving recognition elements receives from among said recognition elements, at least one identifier of said at least one audiovisual portion, and in that said detection module retrieves from the storage space said at least one audiovisual portion previously recorded and associated with said identifier, so as to recognize in the audiovisual content of said at least a second audiovisual programme said at least one audiovisual portion.

10. Activation assembly comprising a processor for executing instructions for activation by recognition of audiovisual portions of audiovisual content from at least a first audiovisual programme in at least a second audiovisual programme, said audiovisual portions serving as synchronization signals, each of said audiovisual portions of audiovisual content consisting of at least one of the following audiovisual portions: an image, an image part, a sound and any combination of at least two of said audiovisual portions, and said at least a first audiovisual programme and said at least a second audiovisual programme, being audio and/or video, comprising an audiovisual content to be broadcast to users, the activation assembly comprising:

a recognition unit for recognizing said synchronization signals in said at least a second audiovisual programme, by recognition of at least one audiovisual portion of audiovisual content in said at least a second audiovisual programme, by means of recognition elements comprising said at least one audiovisual portion being extracted from said at least a first audiovisual programme and being recorded in a storage space, said audiovisual portion being also comprised in said at least a second audiovisual programme, said at least a first audiovisual programme being received prior to reception of said at least a second audiovisual programme, said recognition elements being constructed from pictures, sounds, parts of pictures or combinations of these audiovisual portions of audiovisual content, and an activation unit triggering at least one action in case of detection of said synchronization signals by the recognition unit, wherein at least one of said recognition and activation units delays the triggering of said action by at least a determined timeout lag, in case of detection of said synchronization signals, said recognition unit being in accordance with claim 1.

11. Activation assembly according to claim 10, wherein said activation assembly receives said timeout lag with said recognition elements.

12. Specification unit comprising a processor for executing instructions for specifying audiovisual portions of audiovisual content of at least a second audiovisual programme serving as synchronization signals associated with said at least a second audiovisual programme, each of said audiovisual portions of audiovisual content consisting of at least one of the following audiovisual portions: an image, an image part, a sound and any combination of at least two of said audiovisual portions, and said at least a second audiovisual programme, being audio and/or video, comprising an audiovisual content to be broadcast to users, and said synchronization signals being detected in said audiovisual programme and thus triggering at least one action, wherein said specification unit comprises a preparation module for preparing recognition elements being constructed from pictures, sounds, parts of pictures or combinations of these audiovisual portions of audiovisual content of a first audiovisual programme, which audiovisual portions are also comprised in said second audiovisual programme, said at least a first audiovisual programme being transmitted prior to transmission of said at least a second audiovisual programme, and a transmission module for transmitting said recognition elements independently of transmissions of said at least a second audiovisual programme, to at least one recognition unit detecting said synchronization signals in said at least a second audiovisual programme, by recognizing said audiovisual portions of audiovisual content of said at least a first audiovisual programme in the audiovisual content of said at least a second audiovisual programme, and the preparation and transmission modules of said unit respectively prepare and transmit at least one action timeout lag in case of detection of said synchronization signals, said specification unit cooperating with said recognition unit.

13. Specification unit according to claim 12, wherein the preparation and transmission modules of said unit respectively prepare and transmit identifiers relating to said actions to be triggered in case of detection of said synchronization signals.

14. Specification unit according to claim 13, wherein said action identifiers relate to at least one of the following actions: broadcasting of an interactive service, triggering of an interactive service, triggering of an update of an interactive service, triggering of a recording of said at least a second audiovisual programme and connection to a website.

15. Synchronization system comprising a processor for executing instructions comprising:

a specification unit for specifying audiovisual portions of audiovisual content of at least a second audiovisual programme, said audiovisual portions serving as synchronization signals, each of said audiovisual portions of audiovisual content consisting of at least one of the following audiovisual portions: an image, an image part, a sound and any combination of at least two of said audiovisual portions, and said at least a second audiovisual programme, being audio and/or video, comprising an audiovisual content broadcast to users, a recognition unit for recognizing said synchronization signals in said at least a second audiovisual programme, by recognition of at least one audiovisual portion of audiovisual content extracted from at least a first audiovisual programme in the at least a second audiovisual programme, said at least one audiovisual portion are being comprised in said at least a second audiovisual programme, said at least a first audiovisual programme being received prior to reception of said at least a second audiovisual programme, and an activation unit triggering at least one action in case of detection of said synchronization signals by the recognition unit, said detection being done through recognition in said at least a second audiovisual programme of said at least one audiovisual portion of audiovisual content extracted from said at least a first audiovisual programme, the recognition unit and the activation unit forming an activation assembly, wherein the specification unit prepares and transmits to the recognition unit recognition elements, as well as at least one action timeout lag in case of detection of said synchronization signals, and in that the activation assembly delays the triggering of said action according to said lag transmitted, in case of detection of said synchronization signals, the specification unit being in accordance with claim 12.

16. Broadcasting centre, wherein it comprises a device chosen from among at least a specification unit in accordance with claim 12, a recognition unit, an activation assembly, and a synchronization system.

17. Services operator, wherein it comprises a device chosen from among at least a specification unit in accordance with claim 12, a recognition unit, an activation assembly, and a synchronization system.

18. Terminal for receiving audiovisual programmes, wherein it comprises a device chosen from among at least a specification unit in accordance with claim 12, a recognition unit, an activation assembly, and a synchronization system.

19. Method, implemented by a processor including executable instructions, of activation by recognition of audiovisual portions of audiovisual content from at least a first audiovisual programme in at least a second audiovisual programme, said audiovisual portions serving as synchronization signals, each of said audiovisual portions of audiovisual content consisting of at least one of the following audiovisual portions: an image, an image part, a sound and any combination of at least two of said audiovisual portions, and said at least a first audiovisual programme and said at least a second audiovisual programme, being audio and/or video, comprising an audiovisual content to be broadcast to users, said method comprising the following steps:

reception of at said at least a first audiovisual programme and of said at least a second audiovisual programme, said at least a first audiovisual programme being received prior to reception of said at least a second audiovisual programme, detection of said synchronization signals in said at least a second audiovisual programme received by means of recognition elements comprising at least one audiovisual portion of audiovisual content being extracted from said at least a first audiovisual programme and being stored in a storage space, by recognition of said at least one audiovisual portion in the audiovisual content of said at least a second audiovisual programme, said recognition elements being constructed from pictures, sounds, parts of pictures or combinations of these portions of audiovisual content of said first audiovisual programme, which audiovisual portions are also comprised in said second audiovisual programme, and triggering of at least one action in case of detection of said synchronization signals in said audiovisual programme, wherein the triggering of said action is delayed by at least one determined lag in case of detection of said synchronization signals, said method of activation being implemented by means of an activation assembly.

20. Method according to claim 19, wherein said at least a first audiovisual programme and said at least a second audiovisual programme comprise at least one recognition part containing said at least one audiovisual portion, and at least one live transmission to be broadcast following said recognition part, said synchronization signals being detected during the broadcast of said recognition part and said action being triggered during the broadcast of said following live transmission, by means of said timeout lag.

21. Method, implemented by a processor including executable instructions, of specifying audiovisual portions of audiovisual content of at least a second audiovisual programme, said audiovisual portions serving as synchronization signals associated with said at least a second audiovisual programme, each of said audiovisual portions of audiovisual content consisting of at least one of the following audiovisual portions: an image, an image part, a sound and any combination of at least two of said audiovisual portions, and said at least a second audiovisual programme, being audio and/or video, comprising an audiovisual content to be broadcast to users, said synchronization signals being detected in said at least a second audiovisual programme and thus triggering at least one action, wherein said method of specification comprises the following steps:

preparation of recognition elements being constructed from pictures, sounds, parts of pictures or combinations of these audiovisual portions of audiovisual content of at least a first audiovisual programme, which audiovisual portions are also comprised in said at least a second audiovisual programme, said at least a first audiovisual programme being transmitted prior to transmission of said at least a second audiovisual programme, transmission of said recognition elements independently of transmissions of said at least a second audiovisual programme, for detection of said synchronization signals in said at least a second audiovisual programme, by recognition of said audiovisual portions of audiovisual content of said at least a first audiovisual programme in the audiovisual content of said at least a second audiovisual programme, and transmission of at least one action timeout lag in case of detection of said synchronization signals independently of transmissions of said audiovisual programme, said method being implemented by means of a specification unit.

22. Method according to claim 21, wherein said at least a first audiovisual programme and said at least a second audiovisual programme comprise at least one recognition part containing said at least one audiovisual portion, and at least one live transmission to be broadcast following said recognition part, said synchronization signals being detected during the broadcast of said recognition part and said action being triggered during the broadcast of said following live transmission, by means of said timeout lag.

23. Synchronization method, implemented by a processor including executable instructions, comprising the following steps:

a step of specifying audiovisual portions of audiovisual content of at least a second audiovisual programme, said audiovisual portions serving as synchronization signals associated with said at least a second audiovisual programme, each of said audiovisual portions of audiovisual content consisting of at least one of the following audiovisual portions: an image, an image part, a sound and any combination of at least two of said audiovisual portions, and said at least a second audiovisual programme, being audio and/or video, comprising an audiovisual content to be broadcast to users, in which recognition elements that comprise at least one audiovisual portion of the audiovisual content of said at least a second audiovisual programme are specified for said detection, said recognition elements being constructed from pictures, sounds, parts of pictures or combinations of these audiovisual portions of audiovisual content, a step of detecting said synchronization signals in said at least a second audiovisual programme, in which said synchronization signals are detected in said at least a second audiovisual programme, by recognition of said audiovisual portions of audiovisual content of said at least a first audiovisual programme in the audiovisual content of said at least a second audiovisual programme, said audiovisual portions being also comprised in said at least a second audiovisual programme, said at least a first audiovisual programme being transmitted prior to transmission of said at least a second audiovisual programme, and a step of triggering at least one action in case of detection of said synchronization signals, wherein the triggering of said action is delayed by at least one determined lag in case of detection of said synchronization signals, said synchronization method being implemented by a synchronization system.

24. Method according to claim 23, wherein said at least a first audiovisual programme and said at least a second audiovisual programme comprise at least one recognition part containing said at least one audiovisual portion, and at least one live transmission to be broadcast following said recognition part, said synchronization signals being detected during the broadcast of said recognition part and said action being triggered during the broadcast of said following live transmission, by means of said timeout lag.

25. A computer readable non-transitory storage medium encoded with a computer program comprising the steps of:

receiving at least a first audiovisual programme and at least a second audiovisual programme, being audio and/or video, comprising an audiovisual content broadcast to users, said least a first audiovisual programme being received prior to reception of said at least a second audiovisual programme, and said at least a first audiovisual programme comprising audiovisual portions of content that are also comprised in said second audiovisual programme, detection of audiovisual portions of audiovisual content in said at least a second audiovisual programme, said audiovisual portions of audiovisual content serving as synchronization signals in said at least a second audiovisual programme, each of said audiovisual portions of audiovisual content consisting of at least one of the following audiovisual portions: an image, an image part, a sound and any combination of at least two of said audiovisual portions, and where said detection is done by means of recognition elements extracted from said at least a first audiovisual programme and stored in a storage space, by recognition of said extracted audiovisual portion, in the audiovisual content of said at least a second audiovisual programme, said recognition elements being audiovisual portions of audiovisual content extracted from said at least a first audiovisual programme, and triggering of at least one action in case of detection of said synchronization signals in said at least a second audiovisual programme, wherein the triggering of said action is delayed by at least one determined lag in case of detection of said synchronization signals.

26. A computer readable non-transitory storage medium encoded with a computer program comprising the steps of:

preparing recognition elements comprising at least one audiovisual portion of audiovisual content extracted from at least a first audiovisual programme which at least one audiovisual portion of audiovisual content is also present in at least a second audiovisual programme, said at least a first audiovisual programme being transmitted prior to transmission of said at least a second programme, each of said at least one audiovisual portion of audiovisual content consisting of at least one of the following audiovisual portions: an image, an image part, a sound and any combination of at least two of said audiovisual portions, and said at least a first audiovisual programme and said at least a second audiovisual programme, being audio and/or video, comprising an audiovisual content to be broadcast to users, said recognition elements being constructed from pictures, sounds, parts of pictures or combinations of these audiovisual portions of audiovisual content, transmitting said recognition elements independently of transmissions of said at least a second audiovisual programme, for detection of audiovisual portions of audiovisual content of at least a second audiovisual programme, said audiovisual portions serving as synchronization signals in said at least a second audiovisual programme, by recognition of said audiovisual portions in the audiovisual content of said at least a second audiovisual programme, and transmitting at least one action timeout lag in case of detection of said synchronization signals independently of transmissions of said at least a second audiovisual programme.

27. A computer readable non-transitory storage medium encoded with a computer program comprising the steps of:

specifying audiovisual portions of audiovisual content of at least a second audiovisual programme, said portions serving as synchronization signals associated with said at least a second audiovisual programme, each of said audiovisual portions of audiovisual content consisting of at least one of the following audiovisual portions: an image, an image part, a sound and any combination of at least two of said audiovisual portions, and said at least a second audiovisual programme, being audio and/or video, comprising an audiovisual content to be broadcast to users, in which recognition elements that comprise at least one audiovisual portion of the audiovisual content of said at least a second audiovisual programme are specified for detection, said recognition elements being constructed from pictures, sounds, parts of pictures or combinations of these audiovisual portions of audiovisual content, detecting said synchronization signals in said at least a second audiovisual programme, in which synchronization signals are detected in said at least a second audiovisual programme, by recognition of said audiovisual portions of audiovisual content of said at least a first audiovisual programme in the audiovisual content of said at least a second audiovisual programme, said at least one audiovisual portion being also comprised in said at least a second audiovisual programme, said at least a first audiovisual programme being received prior to reception of said at least a second audiovisual programme, triggering at least one action in case of detection of said synchronization signals, wherein the triggering of said action is delayed by at least one determined lag in case of detection of said synchronization signals.

* * * * *